Nov. 13, 1973　　　　D. W. COSTICH　　　3,772,421
PROCESS FOR MAKING PIGMENTED ART OBJECTS
Filed April 18, 1972
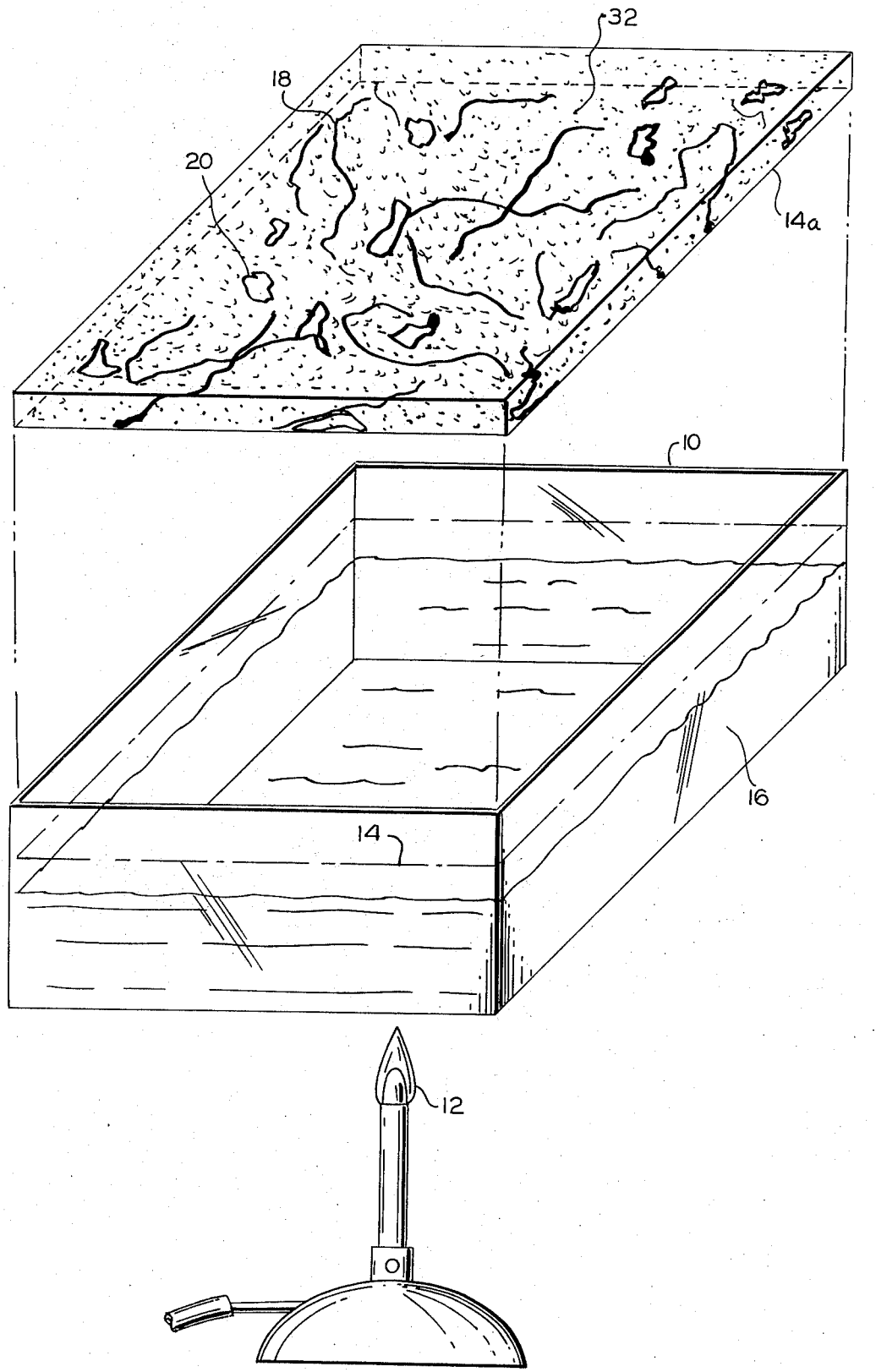

United States Patent Office 3,772,421
Patented Nov. 13, 1973

3,772,421
PROCESS FOR MAKING PIGMENTED ART OBJECTS
Dale W. Costich, Rte. 1, Box 45A,
Brush Prairie, Wash. 98606
Filed Apr. 18, 1972, Ser. No. 245,222
Int. Cl. B29c 9/00
U.S. Cl. 264—74
7 Claims

ABSTRACT OF THE DISCLOSURE

A process for creating a unique artistic colored design on the surface of a suitable base material. In the preferred embodiment of the invention, paraffin and water are heated in a mold until the paraffin melts, forming an even molten layer floating atop the water. While the paraffin layer remains molten, pigments of varying types are poured or dropped into the layer. Each of the pigments is of a type which is more dense than paraffin but preferably less dense than water, and immiscible with respect to both so that no diffusion of the pigments may occur in either medium. Because of their greater density, the pigments sink through the molten paraffin layer until they reach the interface between the paraffin and the water. At this point, either because their density is less than that of the water or because of surface tension factors, they sink no further but rather maintain contact with the under-surface of the molten paraffin layer. After the desired quantities of pigments have been added the paraffin layer is allowed to solidify, with the pigments adhering permanently to its under-surface to form a uniquely colored and textured design.

BACKGROUND OF THE INVENTION

This invention relates to a novel process by which a person having little artistic ability or training may create useful and unique pieces of abstract art. More particularly, the invention is directed to a process by which pigments may be added to a molten base material to which they will adhere upon solidification of the material, thereby forming a unique design.

In the past, various casting techniques have been utilized in which colored materials are added to a liquid or semi-liquid layer of material in a mold to form an artistic design. In most such processes, as described for example in Barnette U.S. Pat. No. 3,306,956, the configuration of the inner surface of the mold determines the surface characteristics of the art piece. While such casting techniques are useful in many applications, they tend to form substantially the same surface contours in the art piece each time the material is cast. This factor makes it impossible to utilize such techniques to produce individualistic art pieces, each having a unique surface configuration corresponding to its own color design, without requiring a separate mold for each configuration. Consequently such prior art techniques lack the degree of versatility required for creation of the unlimited assortment of unique, one-of-a-kind abstract art pieces contemplated herein.

SUMMARY OF THE INVENTION

The process of the present invention is a molding technique for the creation of individualistic art pieces which provides an extremely high degree of versatility not obtainable with previous molding techniques. In the process of the present invention, a molten material from which the art piece is to be constructed is placed in a mold together with a second liquid of greater density. The two liquids are not readily miscible, and therefore the molten substance floats in an even layer atop the denser liquid. While the floating layer remains molten, pigments of varying types are poured or dropped into it. The pigments are not readily miscible with respect to either of the liquids in the mold, and are particularly characterized in that they possess a density greater than that of the floating layer but preferably less than that of the underlying denser liquid. Thus the pigments sink through the molten layer until they reach the interface between the upper and lower liquid layers, where they sink no further due primarily to their buoyancy or, if they are not actually less dense than the denser liquid, due to the surface tension of the lower layer. Because of their immiscibility with respect to both the upper and lower liquid layers, the pigments do not diffuse but rather retain their separate character, forming colored abstract patterns adhering to the undersurface of the floating molten layer. When desired amounts of pigment have been added by the artist, the floating layer is solidified and carefully removed from the mold. On the underside of the layer, a unique and colorful abstract art piece with have been formed, having its own individualistic surface texture with ridges and protrusions where large quantities of pigments have collected, and depressions elsewhere. The texture or contour of the art piece may be varied by dropping such coloring agents as string bits, thread and beads into the molten material together with the other pigments. Preferably the base material from which the art piece is constructed has translucent characteristics so that the piece may be used to produce unusual lighting effects.

It is contemplated that equipment for practicing the process of the present invention will be particularly adaptable for sale in commercialized art kit form, wherein a mold (or instructions for selecting a proper mold) are provided together with the necessary ingredients for performing the process. The use of the kit should provide endless intrigue for the amateur or professional artist, because it is practically impossible to produce any two similar art objects.

It is therefore a principal objective of the invention to provide a technical process for the creation of a wide variety of unique colored art objects, such process being especially adaptable for marketing in kit form but also suitable for use in industrial applications if desired.

It is a further objective of the invention to provide a process for the creation of unique colored art pieces which requires little technical training or artistic talent on the part of the person employing the process.

The foregoing and other objectives, features and advantages of the present invention will be more readily understood upon consideration of the following detailed description of the invention taken in conjunction with the accompanying drawing.

BRIEF DESCRIPTION OF THE DRAWING

The single figure is an exploded perspective view of an illustrative embodiment of the apparatus, ingredients, and end product involved in the practice of a preferred embodiment of the invention.

DESCRIPTION OF THE PREFERRED EMBODIMENT

In practice, the process of the present invention is preferably carried out by utilizing paraffin as the base material for the art piece. Paraffin is inexpensive, readily available, non-toxic, and has translucent qualities when solidified. In addition to these advantages, it is easily converted to its molten state by slight heating, and is less dense than, and substantially immiscible with respect to, water.

In the preferred embodiment of the invention, any heat resistant and leak-proof container 10, having a shape corresponding to that desired for the art piece, can be utilized as a mold. When the mold has been selected, water and paraffin chunks are placed inside and heat is applied from any suitable source such as a burner 12. As heat is applied the paraffin chunks melt and, because of their lesser density and immiscibility with respect to the water, form an even molten layer 14 floating atop the water 16. An alternative method for forming the two layers is to boil water in the mold and then add molten paraffin, which has been premelted in a double boiler for safety, to form the layer 14 of desired thickness (approximately 3/16 of an inch).

During the initial heating process, the paraffin should be heated above its melting point to insure that it will retain its molten state for a period of time sufficient to allow the addition of pigments, in the manner to be described hereafter. Alternatively, heat might be applied continuously to the material in the mold while the pigments are being added, so as to keep the paraffin molten.

With the molten paraffin layer 14 floating atop the hot water 16, a variety of pigments may be poured or dropped at random by the artist onto the top surface of the paraffin. Typical pigments might include vermiform segments of paint 18, chunks of cryon 20, colored chalk 32 and other decorative agents such as colored thread, beads or string. Although the pigments used may be selected from a great variety of coloring agents, they should have several characteristics in common. They should be substantially immiscible both with respect to paraffin and water, so that they will not dissolve or diffuse readily in either medium but rather will maintain their separate identities. In addition, the density of each pigment should be greater than that of molten paraffin, and preferably less than that of water. Thus when the pigments are dropped or poured onto the surface of the paraffin layer 14, their greater density will cause them to sink to the interface between the paraffin and the water, where they will then remain in contact with the lower surface of the paraffin because of their buoyancy with respect to water. It is not essential however that each pigment actually be less dense than the water, but only that it be capable of floating on the water. Thus the pigments may be supported at the interface between the paraffin layer and the water by virtue of the water's surface tension, even though such pigments might be somewhat more dense than water.

The artist may place the pigments in any pattern and in any quantity that he desires in order to form an individualistic, one-of-a-kind design on the bottom surface of the paraffin layer 14. When the addition of the pigments is finished, the paraffin layer may then be allowed to cool and solidify, after which it is carefully excised from the mold. The end product is a wax plate 14a having a uniquely colored and textured undersurface formed by the adherance of the various pigments. The surface can be displayed in almost any medium, preferably with imaginative lighting effects made possible by the translucent quality of the wax and the fluorescent components of the pigment.

One type of pigment which has been found to be suitable for use in the preferred embodiment of the invention, wherein paraffin and water comprise the substances in the mold 10, is a paint having the following ingredients:

| | Gallons |
|---|---|
| DAY-GLO pigment (any color) | 13.23 |
| Inert extenders | 5.20 |
| Aluminum stearate | Trace |
| Bentone | Trace |
| Alcohol | .50 |
| Medium oil or soya alkid | 55.00 |
| Odorless mineral spirits | 24.50 |
| D-1 36% lead drier | .75 |
| D-2 12% cobalt drier | .25 |
| D-4 6% calcium dried | .50 |
| M.E.K.O. | .25 |
| Post 4 | .50 |

Another suitable pigment is a colored crayon which is preferably made by mixing the following combination of ingredients:

| | Grams |
|---|---|
| Double pressed saponified stearic acid Emersol 120 | 13 |
| 128/132 MP standard paraffin | 12 |
| Beeswax | 2.5 |
| Pigment: | |
|     Cyanamid Paris black CB/T 1322-1 | 5 |
| or | |
|     Cyanamid Unitane OR-450 (Rutile) | 10 |

In addition, various colored fluorescent chalks may be used to created unusual appearance under ultraviolet light. A typical chalk suitable for use in the preferred embodiment comprises the following:

| | Grams |
|---|---|
| Plaster of Paris | 90 |
| Calcium carbonate | 10 |
| DAY-GLO pigment (any color) | 25 |
| Potassium tri-poly phosphate | 5 |
| Water | 75 |
| Acetone | 0.85 |

(The first three ingredients are blended together, and added to a mixture of the potassium tri-poly phosphate and water. Thereafter the acetone is added to the mixture.)

As will be readily appreciated by those skilled in the art, the present invention may also be practiced using materials other than paraffin and water. For example a resin or plastic capable of catalytic hardening could be placed in a mold with a more dense and immiscible liquid. Then pigments which are substantially immiscible with respect to both substances and which have densities which fall in the range between them could be added to the resin or plastic to create a design on its under-surface, after which it could be hardened. Similarly, other substances which in their molten form create a definite interface with another denser liquid, and which may be hardened by one means or another without likewise causing the denser liquid to become hardened, would probably be useful in the practice of the artistic process set forth herein. Moreover the process need not necessarily be limited merely to two liquid layers, as three or more layers might conceivably prove advantageous under certain conditions. Accordingly, the terms and expressions which have been employed in the foregoing abstract and specification are used therein as terms of description and not of limitation and there is no intention, in the use of such terms and expressions, of excluding equivalents of the features shown and described or portions thereof, it being recognized that the scope of the invention is defined and limited only by the claims which follow.

What is claimed is:

1. A process for making a unique art object which comprises:
   (a) placing two substantially immiscible liquids in a container, one of said liquids being less dense than the other, so as to cause said less dense liquid to float in a molten layer atop said denser liquid;
   (b) applying pigment material substantially immiscible with respect to both said liquids to the top of said floating layer while said layer remains molten, said pigment material having a density greater than that of said less dense liquid but being capable of floating on said denser liquid;
   (c) allowing said pigment material to sink through said floating molten layer until said pigment material reaches the interface between said layer and said denser liquid; and
   (d) solidifying said less dense liquid layer without thereby also solidifying said denser liquid while said pigment material remains at said interface, thereby causing said pigment material to adhere to said less dense layer.

2. The process of claim 1 wherein said pigment material has a density between that of said less dense liquid and that of said denser liquid.

3. The process of claim 1 wherein said less dense liquid has a melting point higher than that of said denser liquid, and wherein said step of solidifying said less dense liquid comprises cooling the same from its molten state.

4. The process of claim 1 wherein said less dense liquid is paraffin and said denser liquid is water.

5. A process for making a unique art object which comprises:
  (a) floating a layer of molten paraffin atop water in a container;
  (b) adding a pigment more dense than said paraffin and floatable on said water, and not readily miscible with respect to either said paraffin or water, to the top of said paraffin layer while said layer is molten;
  (c) allowing said pigment to sink through said molten paraffin layer until said pigment reaches the undersurface of said paraffin layer;
  (d) allowing said paraffin layer to cool and solidify while said pigment remains at said undersurface of said paraffin layer, thereby causing said pigment to adhere to said under-surface of said paraffin layer; and
  (e) removing said solidified paraffin layer from said container.

6. The process of claim 5 wherein more than one such pigment is added to said paraffin layer, and wherein said pigments are added to said layer in non-uniform quantities and at different locations on the surface of said paraffin layer.

7. The process of claim 5 wherein said pigment is less dense than said water.

References Cited
UNITED STATES PATENTS 3,679,784   7/1972   Rosenberg _____ 264—298

ROBERT F. WHITE, Primary Examiner

T. E. BALHOFF, Assistant Examiner

U.S. Cl. X.R.

161—5, 234; 264—245, 298

UNITED STATES PATENT OFFICE
CERTIFICATE OF CORRECTION

Patent No. 3,772,421                     Dated November 13, 1973

Inventor(s) Dale W. Costich

It is certified that error appears in the above-identified patent and that said Letters Patent are hereby corrected as shown below:

Col. 2, Line 18          Change "with" to --will--.

Signed and sealed this 2nd day of April 1974.

(SEAL)
Attest:

EDWARD M.FLETCHER,JR.              C. MARSHALL DANN
Attesting Officer                  Commissioner of Patents